US012560452B2

(12) United States Patent (10) Patent No.: US 12,560,452 B2
Lu et al. (45) Date of Patent: Feb. 24, 2026

(54) ANNOTATING BASE MAP

(71) Applicant: Yokogawa Electric Corporation,
Tokyo (JP)

(72) Inventors: Brendon Lu, Sugar Land, TX (US);
Sandra Fabiano, Sugar Land, TX (US)

(73) Assignee: Yokogawa Electric Corporation,
Tokyo (JP)

( * ) Notice: Subject to any disclaimer, the term of this
patent is extended or adjusted under 35
U.S.C. 154(b) by 80 days.

(21) Appl. No.: 18/587,615

(22) Filed: Feb. 26, 2024

(65) Prior Publication Data

US 2025/0271277 A1 Aug. 28, 2025

(51) Int. Cl.
G01C 21/00 (2006.01)
(52) U.S. Cl.
CPC ....... G01C 21/3859 (2020.08); G01C 21/383
(2020.08); G01C 21/3896 (2020.08)
(58) Field of Classification Search
CPC ............ G01C 21/3859; G01C 21/3896; G01C
21/383
See application file for complete search history.

(56) References Cited

U.S. PATENT DOCUMENTS

| | | | |
|---|---|---|---|
| 5,333,242 A | 7/1994 | Watanabe et al. | |
| 2019/0332114 A1* | 10/2019 | Moroniti | G01C 21/3807 |
| 2021/0003418 A1 | 1/2021 | Hatayama et al. | |
| 2022/0244741 A1* | 8/2022 | da Silva | B62D 57/032 |

FOREIGN PATENT DOCUMENTS

KR 102262378 6/2021

* cited by examiner

*Primary Examiner* — Aryan E Weisenfeld
(74) *Attorney, Agent, or Firm* — Gray Ice Higdon

(57) ABSTRACT

Implementations relate to translating between a base map of
an industrial facility and robot specific map(s) utilized by
robot(s) to navigate about the industrial facility. First trans-
lation data is generated based on comparing the base map
and a first robot map, and second translation data is gener-
ated based on comparing the base map and a second robot
map. Using the first and second translation data, a pose of a
first environmental feature detected by the first robot in the
first robot map can be translated and graphically rendered in
a corresponding pose in the base map, and a pose of a second
environmental feature in the second robot map can be
translated and graphically rendered in a corresponding pose
in the base map. Association between industrial data
received for industrial components observed in the base map
may also be associated with detection of an environmental
feature in a robot-specific map.

20 Claims, 8 Drawing Sheets

200

IDENTIFY A BASE MAP FOR AN INDUSTRIAL ENVIRONMENT AND A FIRST ROBOT MAP UTILIZED BY A FIRST ROBOT DEPLOYED IN THE INDUSTRIAL ENVIRONMENT, WHERE THE BASE MAP DIFFERS FROM THE FIRST ROBOT MAP 202

GENERATE FIRST TRANSLATION DATA (AND/OR FIRST CORRESPONDENCE DATA) BASED ON COMPARING THE BASE MAP AND THE FIRST ROBOT MAP 204

RECEIVE A FIRST ENVIRONMENTAL FEATURE AND A FIRST ROBOT MAP POSE, FOR THE FIRST ENVIRONMENTAL FEATURE, THAT IS IN A FIRST FRAME OF THE FIRST ROBOT MAP 206

CONVERT, USING THE FIRST TRANSLATION DATA, THE FIRST ROBOT MAP POSE IN THE FIRST FRAME OF THE FIRST ROBOT MAP TO A FIRST BASE MAP POSE IN THE BASE MAP 208

RECEIVE INDUSTRIAL DATA AND A GIVEN MAP POSE THAT CORRESPONDS TO THE INDUSTRIAL DATA 210

DETERMINE THAT THE INDUSTRIAL DATA CORRESPONDS TO THE FIRST ENVIRONMENTAL FEATURE 212

USE THE DETERMINED CORRESPONDENCE OF THE INDUSTRIAL DATA TO THE FIRST FEATURE IN ADAPTING AN INDUSTRIAL PROCESS 214

*FIG. 2*

300

IDENTIFY A BASE MAP FOR AN INDUSTRIAL ENVIRONMENT, A
FIRST ROBOT MAP UTILIZED BY A FIRST ROBOT DEPLOYED IN THE
INDUSTRIAL ENVIRONMENT, AND A SECOND ROBOT MAP UTILIZED
BY A SECOND ROBOT DEPLOYED IN THE INDUSTRIAL
ENVIRONMENT, WHERE THE BASE MAP, THE FIRST ROBOT MAP,
AND THE SECOND ROBOT MAP DIFFER FROM ONE ANOTHER 302

GENERATE FIRST TRANSLATION DATA AND/OR SECOND
TRANSLATION DATA 304

RECEIVE A FIRST ENVIRONMENTAL FEATURE AND A FIRST ROBOT
MAP POSE FOR THE FIRST ENVIRONMENTAL FEATURE (IN A FIRST
FRAME OF THE FIRST ROBOT MAP), AS WELL AS A SECOND
ENVIRONMENTAL FEATURE AND A SECOND ROBOT MAP POSE FOR
THE SECOND ENVIRONMENTAL FEATURE (IN A SECOND FRAME OF
THE SECOND ROBOT MAP) 306

CONVERT, USING THE FIRST AND SECOND TRANSLATION DATA,
THE FIRST ROBOT MAP POSE TO A FIRST BASE MAP POSE, AND THE
SECOND ROBOT MAP POSE TO A SECOND BASE MAP POSE 308

CAUSE RENDERING OF THE BASE MAP WITH A FIRST GRAPHICAL
REPRESENTATION, OF THE FIRST ENVIRONMENTAL FEATURE, AT
THE FIRST BASE MAP POSE AND WITH A SECOND GRAPHICAL
REPRESENTATION, OF THE SECOND ENVIRONMENTAL FEATURE,
AT THE SECOND BASE MAP POSE 310

*FIG. 3*

ANNOTATING BASE MAP

BACKGROUND

Multiple robots can be utilized and deployed at different areas of an industrial facility to perform different missions such as navigating to different points of interest (POIs), capturing images of the POIs, taking gas readings or other measurements, monitoring for anomalies, and/or repairing leakage. For example, at a given time, a first robot (e.g., a wheeled robot carrying a vision sensor) can be performing a first mission that involves navigating to a first POI (e.g., an open space for monitoring anomalies) and capturing corresponding images of the first POI for anomaly detection and/or monitoring (e.g., an oil spill). Continuing with the example, at the given time (or a different time), a second robot (e.g., a drone carrying a gas sensor) can be performing a second mission that involves navigating to a second POI (e.g., a confined space of a large vessel) and detecting presence of certain gas(es) based on gas reading(s) of the gas sensor for the second POI.

In performing the first mission or otherwise navigating about the industrial facility, the first robot utilizes a first robot map that is specific to the first robot. In performing the second mission or otherwise navigating about the industrial facility, the second robot utilizes a second robot map that is specific to the second robot. Put another way, in performing a mission or otherwise navigating about the industrial facility, each robot utilizes a map that is specific to that robot. That is, the map can be utilized by only that robot or by only a subset of robots that are deployed in the environment—while other robot(s) utilize map(s) that are specific to those other robot(s).

For example, a first robot can be a first model of robot from a first manufacturer and utilize a first robot map generated based on past observations from the first robot, and a second robot can be a robot, that is also the first model from the first manufacturer, but can utilize a second robot map generated based on past observations from the second robot. Even though both robots are the same first model from the same first manufacturer, they can utilize distinct maps since no "global" map is utilized and, instead, each generates and utilizes its own robot specific map.

As another example, a first robot can be a first model of robot from a first manufacturer and utilize a first robot map generated based on past observations from the first robot and a second robot can be a robot, that is a second model of robot from a second manufacturer, and can utilize a second robot map generated based on past observations from the second robot.

A robot specific map can be generated in various manners, and can be in various forms. For example, a robot specific map can be generated from Lidar readings and can be stored as a point cloud that is generated based on the Lidar readings.

SUMMARY

As referenced above, in an industrial environment (e.g., industrial facility) with multiple robots, each robot utilizes a map that is specific to that robot. This can present various issues. As one example, vision data from a first robot can be processed to detect a first object (e.g., a dynamic object moving around, such as a forklift or a human) in an environment with the first robot and/or to detect a first pose of the first object. The first pose of the first object is a first robot map specific pose that is relative to a first robot frame of reference ("first frame") of a first robot map utilized by the first robot. Further, vision data from a second robot can be processed to detect a second object in an environment with the second robot and/or to detect a second pose of the second object. The second pose of the second object is a second robot map specific pose that is relative to a second robot frame of reference ("second frame") of a second robot map utilized by the second robot. The environment with the first robot may or may not overlap with the environment with the second robot. The environment with the first robot and the environment with the second robot can each correspond to a portion of the industrial environment.

However, it is not possible to determine, utilizing only the first pose and the second pose, the relative pose between the first object and the second object, as poses of the first object and the second object are detected in different robot maps that have different frames of references. Further, it is not possible to determine, utilizing only the first pose, a first base map pose for the first object on a base map (e.g., a 3D model of the industrial environment)—or to determine, utilizing only the second pose, a second base map pose for the second object on the base map. Accordingly, the detections of the first object and first pose, as well as the detections of the second object and second object pose, are of limited utility.

For example, the first and second objects are unable to be correlated to one another and/or rendered in appropriate locations on a representation of the base map (e.g., to enable an operator to view the positions of the first and second objects within the industrial facility). As another example, the first and second objects are unable to be correlated to industrial automation data (e.g., automatic sensor readings, etc.) that is defined relative to a base map frame of reference ("base frame") of the base map. The base map can be one that is utilized, for example, by humans in monitoring and/or controlling aspects of the industrial facility, robots deployed in the industrial facility, and/or of object(s) or other feature(s) detected by such robots. The base map can be generated, for example, from a 3D model of the facility and/or from a point cloud generated based on Lidar readings (and/or other readings) from within the facility (e.g., from a backpack with Lidar that is worn around the facility by a user for the purpose of mapping). The base map can optionally include rich information about various industrial components within the industrial facility, such as a type of a component, installation date of the component, current or recent readings related to the component, etc.

Implementations disclosed herein relate to translating between each of multiple robot specific maps and a base map of an industrial facility—and using those translations to translate robot specific map poses, of detected environmental features (e.g., the aforementioned first object and/or second object), to base map poses of the detected environmental feature(s). The multiple robot specific maps are each specific to, and utilized by, a subset of robots (e.g., a single robot) deployed in the industrial facility.

For example, comparisons between a base map point cloud (e.g., used to form or generate the base map) and a first robot specific map point cloud (e.g., used to form or generate the first robot map) can enable determination of (a) first correspondences between points in the base map and points in the first robot map (sometimes referred to as "first robot specific map") and/or determination of (b) first translation function(s) for translating between points in the base map and points in the first robot map.

As another example, comparisons between the base map point cloud and a second robot specific map point cloud (e.g., used to form or generate the second robot map) can enable determination of (a) second correspondences between points in the base map and the second robot map (sometimes referred to as "second robot specific map") and/or (b) second translation function(s) for translating between points in the base map and the second robot map.

Translating the robot map pose of a robot detected environmental feature to the base map pose can enable, for example, the detected environmental feature to be rendered, in a representation of the base map, at an appropriate location (and/or with an appropriate orientation) within the representation of the base map. Translating the robot map pose of the robot detected environmental feature to the base map pose can additionally or alternatively enable, for example, features from multiple disparate robots to be simultaneously rendered and/or correlated with one another in the representation of the base map.

Translating the robot map pose of the robot detected environmental feature to the base map pose can additionally or alternatively enable, for example, a detected environmental feature to be correlated to industrial automation data that is defined relative to the base map, but not defined relative to any robot specific maps. For example, techniques described herein may enable occurrences of detections of certain equipment near an industrial component to be correlated to occurrences of abnormal sensor readings that are associated with the industrial component. The abnormal sensor readings can be defined relative to the base map of the industrial environment (e.g., a pose of the industrial component, to which the sensor readings correspond, can be defined in the base map).

In various implementations, a method implemented using one or more processors is provided and includes: identifying a base map for an industrial environment and a first robot map utilized by a first robot deployed in the industrial environment, where the base map differs from the first robot map. The industrial environment can be or can include an industrial facility at which the first robot is deployed. In some implementations, the first robot map can be generated based on observations of the industrial environment (or a portion thereof) by the first robot. For example, the first robot map can be generated based on observations by the first robot along one or more planned routes within the industrial environment.

In some implementations, the base map can be generated based on observations of the industrial environment (e.g., in its entirety) using a sensor (e.g., Lidar sensor) that is carried around the industrial environment. For instance, the base map can be a 3D base map point cloud rendered using the sensor readings of the sensor. In some implementations, the base map can be a 3D model of the industrial environment, such as a 3D floor plan. In some implementations, the base map can be a 2D model of the industrial environment, which is converted from the 3D model.

In some implementations, identifying the base map for the industrial environment and the first robot map can optionally be in response to receiving a user input from a user that requests to monitor the industrial environment.

In some implementations, the first robot map is generated from sensor readings of one or more sensors of the first robot. The first robot map, for instance, can be a first robot map point cloud (e.g., 3D) collected using the one or more sensors (which can be, for instance, movably attached to the first robot). In some implementations, the first robot map is stored locally at the first robot. In some implementations, additionally or alternatively, the first robot map is stored at one or more server devices in communication with the first robot.

In various implementations, the method can further include: generating first translation data (and/or first correspondence data) based on comparing the base map and the first robot map. As a non-limiting example, the base map can take the form of a 3D base map point cloud (sometimes simply referred to as "base map point cloud"), and the first robot map can take the form of a 3D first robot specific map point cloud (sometimes simply referred to as "first robot specific map point cloud" or "first robot map point cloud"). In this non-limiting example, points in the base map point cloud can be compared with points in the first robot specific map point cloud, to determine first translation data (and/or first correspondence data) between the points in the first robot specific map and the points in the base map.

The first translation data can, for instance, include a first translation function that is applicable to translate any robot point in the first robot map to a corresponding base point in the base map. The first correspondence data, for instance, can include a mapping relationship between one or more points in the first robot map to one or more corresponding points in the base map.

For instance, given a point $(X_1, Y_1, Z_1)$ in the first robot map, the first translation data can indicate a point $(X_1+4.5, Y_1+3.5, Z_1)$ in the base map corresponds to the point $(X_1, Y_1, Z_1)$ in the first robot map. For instance, given the point $(X_1, Y_1, Z_1)$ in the first robot map, the first correspondence data can indicate a point $(X_1', Y_1', Z_1')$ in the base map corresponds to, or is mapped to, the point $(X_1, Y_1, Z_1)$ in the first robot map.

In various implementations, the method can further include: receiving a first environmental feature and a first robot map pose, for the first environmental feature, that is in a first frame of the first robot map. In these implementations, the first feature and the first robot map pose can be determined based on processing first sensor data that is in the first frame and that is detected by the first robot. The first environmental feature, for instance, can be or correspond to a first object within the industrial environment, such as a forklift or a human. The first environmental feature can be detected by the first robot based on processing first sensor data (e.g., Lidar data) that is in the first frame of the first robot map. In some implementations, the first sensor data (e.g., Lidar data) can be further processed to determine the first robot map pose (location and/or orientation) for the first environmental feature in the first frame of the first robot map.

In some implementations, the first feature and the first robot map pose can be determined based on processing the first sensor data using a machine learning model. In some implementations, instead of the first sensor data, additional first sensor data different from the first sensor data can be applied to detect the first environmental feature, or to determine the first robot map pose for the first environmental feature in the first frame. In other words, different sensor data or partially different sensor data may optionally be captured and utilized to detect the first environmental feature and to determine the first robot map pose for the first environmental feature in the first frame.

As a non-limiting example, the first frame can include a reference point at an origin of a first landmark, and can include three reference points each at one unit distance along coordinate axes (e.g., X-axis, Y-axis, and Z-axis). In this non-limiting example, a first robot pose (e.g., X1, Y1, Z1) of the first robot can be determined with respect to the first landmark, and the first robot map pose (e.g., X1+m, Y1+n, Z1) for the first environmental feature can be determined based on relative pose between the first robot and the first environmental feature in the first frame.

In various implementations, the method can further include: converting, using the first translation data, the first robot map pose of the first environmental feature (i.e., in the first frame of the first robot map) to a first base map pose of the first environmental feature (i.e., in the base map). Continuing with the above non-limiting example, given the first robot map pose (e.g., X1+m, Y1+n, Z1) for the first environmental feature in the first frame, the first translation data may be utilized to determine that the first base map pose (e.g., X1+m+4.5, Y1+n+3.5, Z1) in the base map corresponds to the first robot map pose (e.g., X1+m, Y1+n, Z1) in the first frame.

In some implementations, the first environmental feature corresponds to a movable object that is movable within the industrial environment. For instance, the first environmental feature can correspond to a movable object (e.g., a forklift or human operator) that is movable with respect to a fixed component within the industrial environment.

In various implementations, the method can further include: receiving industrial data and a given map pose (e.g., in the base map) that corresponds to the industrial data. In some implementations, the industrial data can be received from the aforementioned fixed component (or an industrial component that remains constantly unchanged or remains fixed for a period of time) within the industrial environment. In some implementations, the industrial data includes, for instance, an abnormal sensor reading. The abnormal sensor reading, for instance, can be provided by the fixed component (e.g., a fixed sensor) within the industrial environment. In some implementations, the industrial data containing abnormal sensor reading can be included and be received in a warning message. In some implementations, the given map pose that corresponds to the industrial data can, for instance, include a location and/or an orientation that is defined/determined in the base map for the fixed component (e.g., the fixed sensor).

The industrial data (e.g., the abnormal sensor reading) and/or the given map pose, for instance, can be transmitted via one or more networks. Alternatively or additionally, the industrial data can be transmitted via the one or more networks, along with an identifier of the fixed component (e.g., the fixed sensor) with which the industrial data is associated. The identifier of the fixed component (e.g., the fixed sensor) may allow the given map pose to be derived when the industrial data is captured using the fixed sensor.

In various implementations, the method can further include: determining that the industrial data corresponds to the first environmental feature. In some implementations, determining that the industrial data corresponds to the first environmental feature can be based on: determining that the industrial data temporally corresponds to detection of the first environmental feature, and determining that the first base map pose, for the first environmental feature, positionally corresponds to the given map pose for the industrial data.

In some implementations, determining that the industrial data temporally corresponds to detection of the first environmental feature comprises: determining that an industrial data timestamp, for the industrial data, satisfies a temporal threshold relative to an environmental feature timestamp, for the first environmental feature, that is based on one or more times associated with the first sensor data. In some implementations, the temporal threshold can be determined based on an industrial data type of the industrial data and/or an environmental feature type of the first environmental feature. For example, a first temporal threshold (e.g., 0.1 s) can be determined when the first environmental feature is a forklift and the industrial data is of a first sensor type. A second temporal threshold (different from the first threshold, e.g., 0.2 s) can be determined when the first environmental feature is a forklift and the industrial data is of a second sensor type (that is different from the first sensor type). A third threshold (different from the first and/or second thresholds, e.g., 2 s) can be determined when the first environmental feature is a maintenance crew and the industrial data is of a third sensor type.

In some implementations, determining that the first base map pose, for the first environmental feature, positionally corresponds to the given map pose for the industrial data can include: determining that the first base map pose and the given map pose satisfies a distance threshold. The distance threshold can vary or be determined based on the industrial data type of the industrial data and/or the environmental feature type of the first environmental feature. For instance, a first distance threshold can be determined when the first environmental feature is a maintenance crew, and a second threshold can be determined when the first environmental feature is a forklift, where the first threshold can be less than the second threshold.

In various implementations, the method can further include: using the determined correspondence of the industrial data to the first feature in adapting an industrial process. In some implementations, using the determined correspondence of the industrial data to the first feature in adapting the industrial processing can include: adapting one or more parameters, for operating a component (e.g., to which the fixed sensor is attached or for which the abnormal sensor reading is acquired using the fixed sensor), used in the industrial process, based on a type of the first environmental feature and/or a type of the industrial data. As a non-limiting example, adapting the industrial process can include pausing the industrial process if the type of the first environmental feature indicates that the first environmental feature is fluid leakage and that the type of the industrial data is low pressure. In some implementations, adapting the industrial process can, for instance, include adapting the industrial process via the first environmental feature if, for instance, the type of the first environmental feature indicates that the first environmental feature is a maintenance staff or a repairing tool/robot.

In various implementations, an additional method implemented using one or more processors is provided and includes: identifying a base map for an industrial environment, a first robot map utilized by a first robot deployed in the industrial environment, and a second robot map utilized by a second robot deployed in the industrial environment. The base map, the first robot map, and the second robot map can all differ from one another.

The industrial environment can be or can include an industrial facility at which the first robot and a second robot are deployed. The first robot and the second robot can be of the same type or can be of different types. The first robot and the second robot can be manufactured by the same manufacturer or by different manufacturers. In some implementations, even if the first robot and the second robot are of the same type and are manufactured by the same manufacturer, the first robot and the second robot can generate and utilize different robot specific maps (i.e., the first robot map generated based on observations of the industrial environment by the first robot along a first route, and the second robot map generated based on observations of the industrial environment by the second robot along a second route which differs from the first route).

In some implementations, the first robot map can be for a first region of the industrial facility (e.g., include one or more landmarks within the first region for the first robot to determine its pose within the first region), and can correspond to a first portion of the base map. The second robot map can be for a second region of the industrial facility, and can correspond to a second portion of the base map. The first portion may or may not overlap with the second portion. It is noted that even if the first region coincides with the second region, the first robot map may still differ from the second robot map as they may have different origins and/or coordinate systems. In this case, relative poses between the first robot and the second robot may not be determined given only a first robot pose that is determined for the first robot in the first robot map and a second robot pose that is determined for the second robot in the second robot map. Further, a first robot base pose for the first robot in the base map may not be determined, and a second robot base pose for the second robot in the base map may not be determined as correspondences between the first (or second) robot and the base map remains undetermined.

To address the above concerns, in various implementations, the additional method further includes: generating first translation data (and/or first correspondence data) based on comparing the base map and the first robot map; and generating second translation data (and/or second correspondence data) based on comparing the base map and the second robot map.

In some implementations, the first translation data includes a first translation function that can be applied to translate any point in the first robot map to a corresponding point in the base map. In some implementations, the second translation data includes a second translation function that is distinct from the first translation function and that is applicable to translate any point in the second robot map to a corresponding point in the base map.

As a non-limiting example, the base map can take the form of a 3D base map point cloud (sometimes simply referred to as "base map point cloud"), and the first robot map can take the form of a robot map point cloud. In this non-limiting example, points in the base map point cloud can be compared with points in the first robot specific map point cloud, to determine first translation data (and/or first correspondence data) between the points in the first robot specific map and the points in the base map. Similarly, points in the base map point cloud can be compared with points in the second robot specific map point cloud, to determine second translation data (and/or second correspondence data) between the points in the second robot map and the points in the base map.

The first translation data can, for instance, include a first translation function that can be applied to translate any robot point in the first robot map to a corresponding base point in the base map. The first correspondence data can include an explicit mapping relationship between one or more points in the first robot map to one or more corresponding points in the base map. The second translation data can include a second translation function that differs from the first translation function and that can be applied to translate any robot point in the second robot map to a corresponding base point in the base map. The second correspondence data can include an explicit mapping relationship (e.g., mapping matrix) between one or more points in the second robot map to one or more corresponding points in the base map. It is noted that, using the first (or second) translation function and/or the first (or second) correspondence data, a designated point in the base map may also be translated into a particular point in the first (or second) robot map.

In various implementations, the additional method further includes: receiving a first environmental feature and a first robot map pose, for the first environmental feature, that is in a first frame of the first robot map, wherein the first environmental feature and the first robot map pose are determined based on processing first sensor data that is in the first frame and that is detected by the first robot; and receiving a second environmental feature and a second robot map pose, for the second environmental feature, that is in a second frame of the second robot map, wherein the second environmental feature and the second robot map pose are determined based on processing second sensor data that is in the second frame and that is detected by the second robot.

In some implementations, the first environmental feature corresponds to a first object within the industrial environment. In some implementations, the second environmental feature corresponds to a second object within the industrial environment.

In some implementations, the first feature and the first robot map pose are determined based on processing first sensor data using a first machine learning model. In some implementations, the second feature and the second robot map pose are determined based on processing the second sensor data using a second machine learning model that is different from the first machine learning model. The first sensor data can be Lidar data detected using a first Lidar sensor carried by the first robot. The second sensor data can be additional Lidar data detected using a second Lidar sensor carried by the second robot.

In some implementations, the first robot map is generated from sensor readings of one or more sensors (e.g., including the aforementioned first Lidar sensor) of the first robot. In some implementations, the second robot map is generated from sensor readings of one or more sensors (e.g., including the aforementioned second Lidar sensor) of the second robot.

In various implementations, the additional method further includes: converting, using the first translation data, the first robot map pose to a first base map pose (i.e., in the base map); and converting, using the second translation data, the second robot map pose to a second base map pose (e.g., in the base map).

In various implementations, the additional method further includes: causing rendering of the base map with a first graphical representation, of the first environmental feature, at the first base map pose and with a second graphical representation, of the second environmental feature, at the second base map pose.

In some implementations, the base map is further rendered with graphical representations of industrial data that is included in the base map, but that is absent from the first robot map and absent from the second robot map. The graphical representations of industrial data can indicate a type of a component associated with the industrial data, installation date of the component, current or recent readings related to the component, etc.

In various implementations, a further method implemented using one or more processors is provided and includes: identifying a base map for an industrial environment and a first robot map utilized by a first robot deployed in the industrial environment, where the base map differs from the first robot map.

In various implementations, the further method further includes: generating first translation data based on comparing the base map and the first robot map; receiving a first environmental feature associated with equipment in the industrial environment and a first robot map pose, for the first environmental feature, that is in a first frame of the first robot map, wherein the first environmental feature and the first robot map pose are determined based on processing first sensor data that is in the first frame and that is detected by the first robot; converting, using the first translation data, the first robot map pose to a first base map pose; receiving industrial data indicating an abnormal condition and a given map pose that corresponds to the industrial data; determining that the industrial data corresponds to the first environmental feature; and storing the determined correspondence of the industrial data to the first feature in a database accessible within the industrial environment.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example method for performing selected aspects of the present disclosure, in accordance with various implementations.

FIG. 3 illustrates another example method for performing selected aspects of the present disclosure, in accordance with various implementations.

DETAILED DESCRIPTION

Figure 1A:
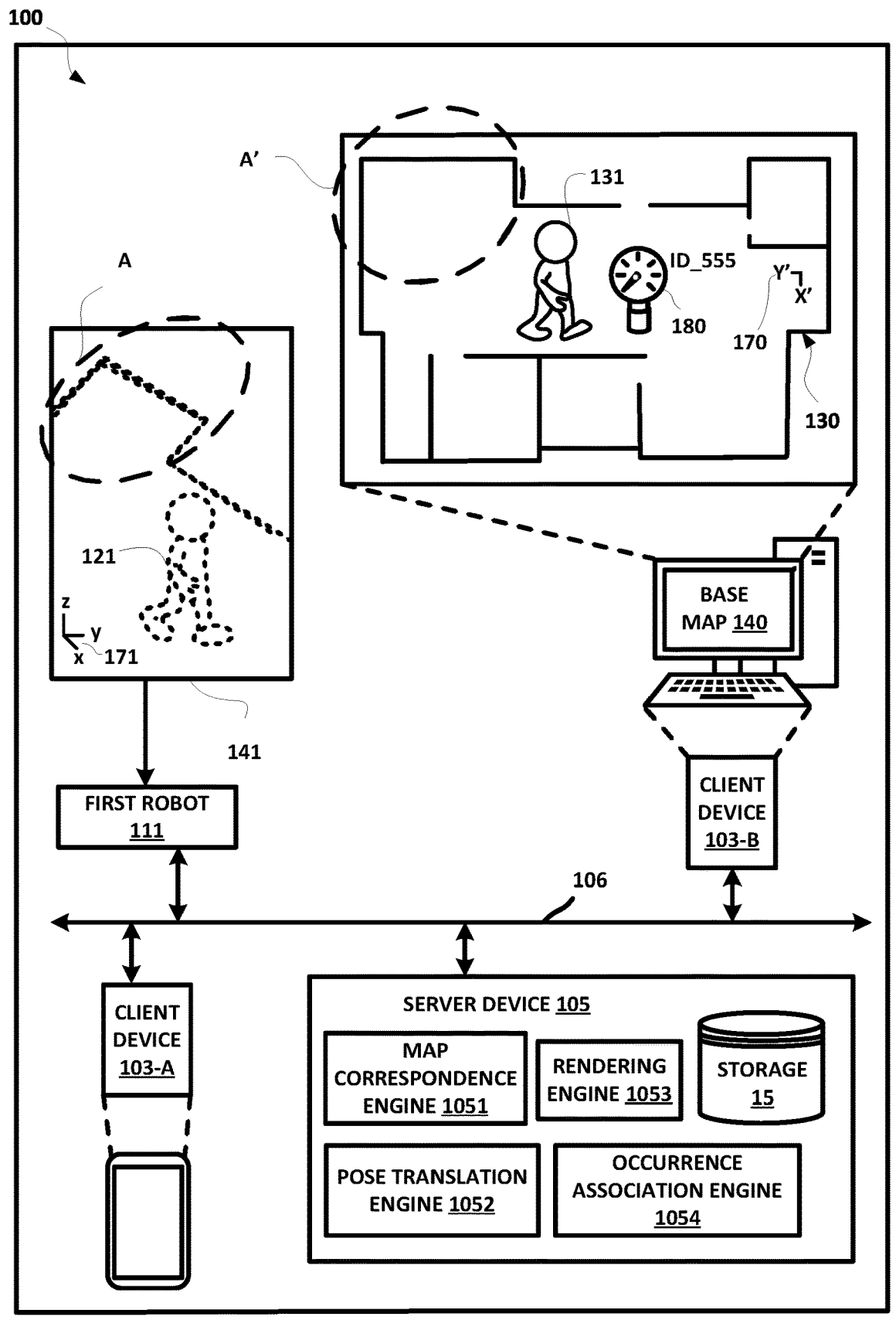
FIG. 1A schematically depicts an example environment in which selected aspects of the present disclosure can be implemented, in accordance with various implementations.

Implementations disclosed herein relate to translating between each of one or more robot specific maps and a base map of an industrial facility—and using those translations to translate robot specific map poses, of detected environmental features, to base map poses of the detected environmental features. The one or more robot specific maps can each be specific to, and utilized by, a subset of robots (e.g., a single robot) deployed in the industrial facility. For example, the one or more robot specific maps can include a first robot specific map (sometimes referred to as "first robot map") utilized by a first robot deployed at the industrial facility, and/or a second robot specific map (sometimes referred to as "second robot map") utilized by a second robot deployed at the industrial facility.

In some implementations, the base map can be, or otherwise generated from, a base map point cloud. In some implementations, the first robot map can be (or otherwise be generated from) a first robot specific map point cloud (can also be referred to as "first robot map point cloud"). The comparisons between the base map point cloud and the first robot specific map point cloud can enable determination of first correspondences (e.g., explicit mappings) between points in the base map and points in the first robot specific map. Alternatively or additionally, the comparisons between the base map point cloud and the first robot specific map point cloud can enable determination of first translation function(s) for translating between points in the base map and points in the first robot map.

In some implementations, the second robot map can be (or otherwise be generated from) a second robot specific map point cloud (can also be referred to as "second robot map point cloud"). Comparisons between the base map point cloud and the second robot map point cloud can enable determination of second correspondences between points in the base map and the second robot map. Additionally or alternatively, the comparisons between the base map point cloud and the second robot map point cloud can enable determination of second translation function(s) for translating between points in the base map and the second robot map.

Using the first correspondences and/or the first translation function(s), a robot map pose of a first object (e.g., a movable object such as a human operator or a forklift) detected by the first robot can be translated from the first robot map to the base map. Using the second correspondences and/or the second translation function(s), a robot map pose of a second object (e.g., a movable object such as a human operator or a forklift) detected by the second robot can be translated from the second robot map to the base map. Translating the robot map pose of a robot detected environmental feature (e.g., the first object or the second object) to the base map pose can enable, for example, the detected environmental feature to be rendered, in a representation of the base map, at an appropriate location (and/or with appropriate orientation) within the representation of the base map.

Translating the robot map pose of the robot detected environmental feature to the base map pose can additionally or alternatively enable, for example, different environmental features (e.g., the first and second objects) detected by multiple disparate robots to be simultaneously rendered and/or correlated with one another in a representation of the base map. In this case, relative poses (e.g., positions and/or orientations) between the first object and the second object can be precisely determined or visually perceived.

Translating the robot map pose of a robot detected environmental feature to the base map pose can additionally or alternatively enable, for example, the robot detected environmental feature to be correlated to industrial automation data (e.g., low pressure) that is defined relative to the base map, but is not defined relative to any robot specific maps. For example, occurrences of detections of certain equipment by a robot (e.g., the first robot) near an industrial component in the first robot map can be correlated to occurrences of abnormal sensor readings that are associated with the industrial component in the base map. As another example, occurrences of detections of certain abnormal conditions (e.g., leakage) by a particular robot (e.g., the first robot, which navigates inside or outside a pipe to monitor for leakage) near an industrial component in the first robot map can be correlated to occurrences of abnormal sensor readings (e.g., low pressure) that are associated with the industrial component in the base map. In this latter example, subsequently, if an abnormal sensor reading associated with the same industrial component (in the base map) is received, the particular robot can be sent to the pose at which a previous leakage is detected, to inspect any current leakage, and/or an additional robot can be sent to the pose to repair the leakage.

By utilizing translations or correspondence determined between the base map and the first robot map (or the second robot map), representations of dynamic object(s) detected by one or more robots that are deployed at an industrial facility can be rendered dynamically in the base map. The translations or correspondence determined between the base map and the first robot map also enable association of the occurrence of object or event (e.g., leakage) detected by a robot in a particular pose at the robot specific map with industrial data (e.g., low pressure) automatically received from a fixed sensor for an industrial component (which is fixed within the industrial facility) in the base map. The industrial data is reflected in the base map but not reflected in the first robot map, as the first robot map may not include the industrial component but the base map indicates a pose of the industrial component.

FIG. 1A schematically depicts an example environment in which selected aspects of the present disclosure may be implemented, in accordance with various implementations. Referring now to FIG. 1A, an example environment 100 in which various aspects of the present disclosure may be implemented is depicted schematically. The example environment 100 may be, or may include, an industrial facility 130, which may take numerous forms. The example environment 100 may be optionally designed to implement any number of at least partially automated processes. The industrial facility 130 may take the form of a chemical processing plant, an industrial office environment, an oil or natural gas refinery, a catalyst factory, a manufacturing facility, an offshore oil platform, or any other applicable facility.

The example environment 100 may include one or more client devices (e.g., local client devices 103-A and 103-B) operably coupled with a process automation network 106 in the industrial facility. The client device 103-A or 103-B may be implemented as a computer (e.g., laptop, desktop, notebook), a tablet, a robot, a smart appliance (e.g., smart phone), a messaging device, a wearable device (e.g., watch), or any other applicable device. The process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh).

In various implementations, the example environment 100 may include a base map 140, where the base map 140 may be rendered via a display of the client device 103-A (or the client device 103-B, or other devices such as the server device 105). The base map 140 can be, or can be generated from, a 3D model, or from a 3D point cloud collected using a Lidar sensor that is carried around the industrial facility 130. For instance, the base map 140 can be generated based on observations by the Lidar sensor for the industrial facility 130 (e.g., in its entirety) when the industrial facility 130 is free of any mobile robot (or prior to any robot is deployed at the industrial facility 130). In this instance, the base map 140 can be lacking any indications of any robot at a robot pose (i.e., position and/or orientation of any mobile robot or movable objects detected by the mobile robot). In some implementations, the base map 140 can show various static components (e.g., doors, open space, window, walls, industrial components such as tanks, equipment, fixed sensors, etc.) of the industrial facility 130. For instance, as shown in FIG. 1A, the base map 140 can include and show the structure A' and an industrial component 180 (e.g., a pressure gauge).

The client device 103-A or 103-B may each include input device(s) and/or output device(s) for user interaction with the base map 140. For instance, a user input (e.g., a click at a graphical representation in the base map 140 that represents the industrial component 180) received via an input device of the client device 103-B may cause industrial data associated with the industrial component 180 to be graphically rendered at the base map 140. The industrial data, for instance, can include an ID (e.g., a device ID of 555) for the industrial component 180, a status of the industrial component 180 (normal or out-of-order, etc.), a maintenance history of the industrial component 180, a measurement for the industrial component 180, etc.

The example environment 100 may further include one or more mobile robots. For instance, the example environment 100 may include a robot fleet having a first robot 111. The first robot 111 may be a quadruped robot (e.g., a robot dog), a wheeled robot, an unmanned aerial vehicle (e.g., a drone), a crawler robot, or any other applicable robot movable within or around the industrial facility. Different robots may be of different types and may be manufactured by different manufacturers. The different robots may utilize different robot-specific maps (e.g., which, however, may all in the form of a 3D point cloud) for navigation and for performing tasks/missions. In some implementations, the robot fleet may include a subset of robots of the same type and/or manufactured by the same manufacturer. In these implementations, it is possible that robot-specific maps that are generated and/or respectively utilized by a corresponding robot from the subset of robots are still different from each other, for instance, when different robots from the subset are deployed or programmed to observe the industrial facility (e.g., 130) along different planned routes. This is because, for instance, a robot-specific map can be generated based on past observations of a robot, and the past observations of the robot can vary depending on routes the robot previously traveled along.

As a non-limiting example, the first robot 111 can be a wall-climbing robot (e.g., to inspect outside vessel or walls for an industrial facility 130), a crawler robot (e.g., to operate and manipulate certain components of the industrial facility), or a drone (e.g., to inspect chimneys and infrastructure of the industrial facility, or to inspect the inside of a vessel of the industrial facility, etc.). In some implementations, instead of being a wall-climbing robot, the first robot 111 can instead be a robot to transport supplies and product, a robot dog to patrol and monitor the industrial facility for anomalies, a spider robot to inspect outside pipelines, a snake robot to inspect inside pipelines, or other type of robot.

In some implementations, the first robot can include one or more sensors for performing one or more missions. For instance, the first robot 111 can include (or otherwise be equipped with) a light Detection and Ranging (Lidar) sensor to image objects by producing a 3D model for the imaged objects. Additionally or alternatively, the first robot 111 can include other sensors such as a vision sensor, ultrasonic testing immersion transducers for detecting surface irregularities and flaws (e.g., corrosion), one or more gas sensors for detecting presence and concentration of hazardous gasses or vapors, and/or a temperature sensor for measuring temperatures, etc. The vision sensor may be a monographic camera, a stereographic camera, a thermal camera, or any other applicable vision sensor, to capture one or more images of one or more particular components of the industrial facility 130. The vision sensor may be removably coupled to, or be integrated into, the first robot 111. In some implementations, the vision sensor may change location and/or orientation with respect to the first robot 111, for example, by rotation or other movement. As a non-limiting example, the first robot 111 can include front and rear high-definition cameras removable coupled to the first robot 111.

In some implementations, the first robot 111 can optionally be deployed at one or more regions of the industrial facility 130. For instance, the first robot 111 can be deployed to navigate around a first region of the industrial facility 130. While being deployed to navigate around the first region, the first robot 111 may generate a plurality of points reflecting one or more components and/or objects of the first region. For instance, the first robot 111 can detect one or more points corresponding to a structure A of the industrial facility 130 in a first robot map 141 specific to the first robot 111, and can further detect a moving object 121 (e.g., a human) in the first robot map 141. In some implementations, the first robot map 141 can have a first reference frame 171 (sometimes referred to as a "first frame", which can be visually rendered or not rendered), and a robot map pose of the moving object 121 can be determined in the first frame of the first robot map 141.

The example environment 100 may further include a server computing device 105 (can be simply referred to as "server device"). The server computing device 105 may include a map correspondence engine 1051, a pose translation engine 1052, a rendering engine 1053, and/or a storage 15. In some implementations, the base map 140 can be stored at the storage 15. In some implementations, optionally, the example environment 100 may include more than one base map (e.g., base maps determined at different years or for different industrial facilities, etc.).

In various implementations, the map correspondence engine 1051 can request access to the first robot map (e.g., stored at the first robot 111) to compare the first robot map with the base map 140. The map correspondence engine 1051 can compare the first robot map with the base map 140, to determine that the structure A in the first robot map 141 is the same structure as the structure A' in the base map 140. In this case, one or more points corresponding to the structure A in the first robot map 141 can be compared to one or more points of the structure A' in the base map 140, to determine first correspondence data (e.g., the aforementioned first correspondences), and/or first translation data.

The first correspondence data can, for instance, include an explicit mapping relationship between one or more 3D points in the first robot map to one or more 3D points in the 3D point cloud used to form the base map 140. The first translation data, for instance, can include a translation function that translates one or more points in the first robot map 141 to one or more corresponding points in the 3D point cloud that forms the base map 140, or vice versa.

In various implementations, the server device 105 (or the client device, e.g., 103-B) can receive a first robot map pose, for a first environmental feature (e.g., the aforementioned moving object 121, which can be a walking human operator), that is in the first frame of the first robot map. The pose translation engine 1052 can convert, using the first correspondence data and/or the first translation data, the first robot map pose of the first environmental feature (e.g., a moving object 121) in the first robot map 141 into a first base map pose in the base map 140. The rendering engine 1053 can further render a first graphical representation 131 of the first environmental feature (e.g., moving object 121) at the first base map pose in the base map 140.

It is noted that the first graphical representation 131 of the first environmental feature in the base map 140 can differ from points corresponding to the first environmental feature in the first robot map 141. The first graphical representation 131 can be, for instance, an image of the first environmental feature, a symbol characterizing the first environmental feature, etc. In some implementations, representations of objects in the base map that are captured by the first robot can optionally be in a particular form (e.g., color, size, bounding box, etc.) specific to the first robot. Optionally, based on tracking poses of the first environmental feature in the first robot map 141 at different times, the rendering engine 1053 can render the first graphical representation 131 of the first environmental feature (e.g., moving object 121) at corresponding poses in the base map 140 at the different times, so that the base map 140 is a "dynamic" map for a user to view and track movement of the first environmental feature (e.g., moving object 121) within the industrial facility 130, via the base map 140.

In some implementations, the server computing device 105 may further include an occurrence association engine 1054. The occurrence association engine 1054 can determine, based on the translations and/or correspondence between the base map and the first robot map, whether the occurrence of an object or event (e.g., the moving object 121) detected by the first robot 111 (or other robot) at a particular pose (e.g., the first robot map pose) in the first robot map 141 is associated with industrial data (e.g., low pressure sensor reading) automatically received for an industrial component (e.g., the fixed gauge 180) in the base map, such as industrial data that is correlated to the base map but not to the first robot map. It is noted that the base map 140 can be a 2D map (or 3D map) having a coordinate system 170 defined by an origin, an X'-axis, and a Y'-axis.

Figure 1B:
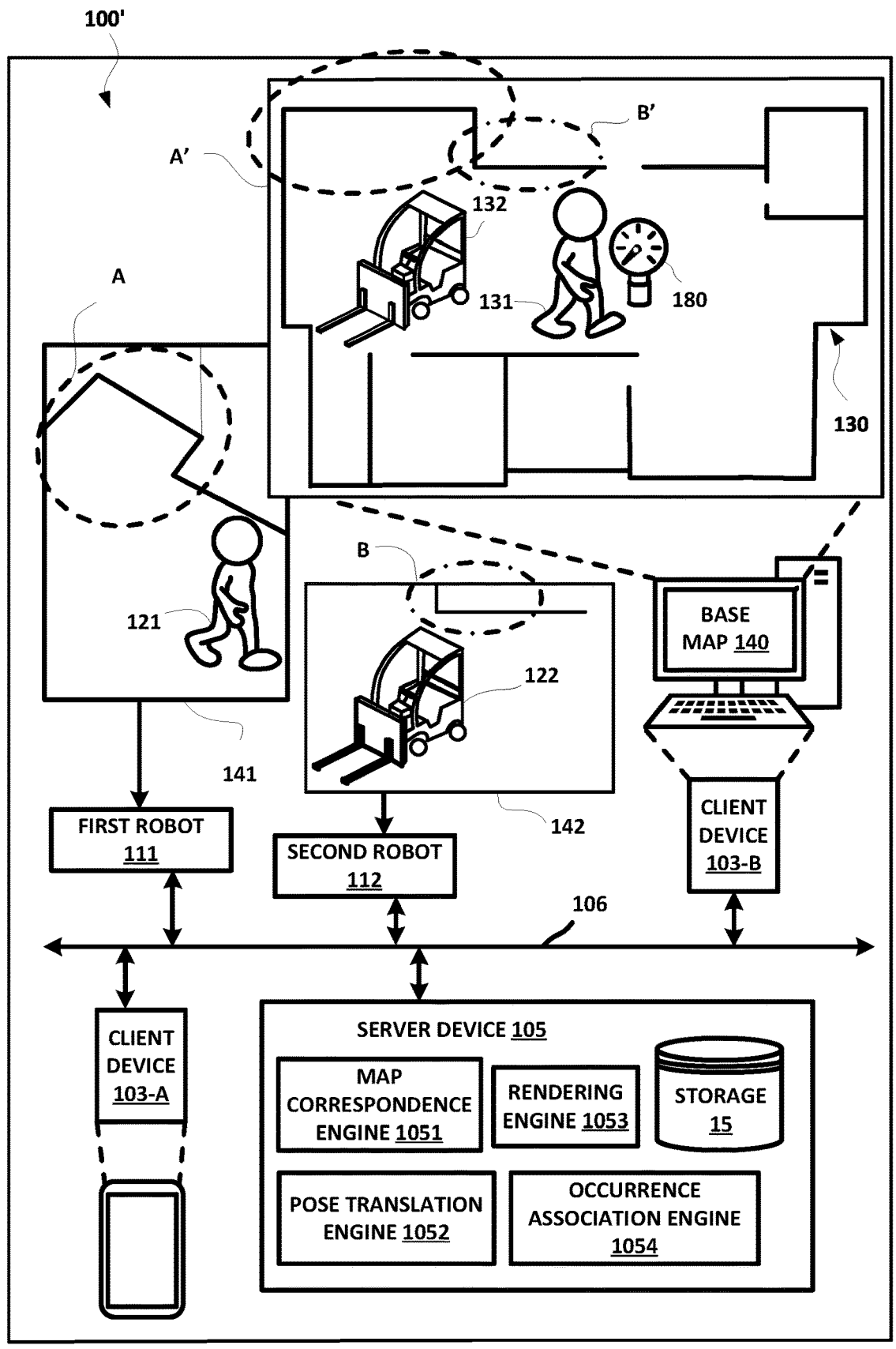
FIG. 1B schematically depicts another example environment in which selected aspects of the present disclosure can be implemented, in accordance with various implementations.

FIG. 1B schematically depicts another example environment 100' in which selected aspects of the present disclosure can be implemented, in accordance with various implementations. As shown in FIG. 1B, the environment 100' can include a robot fleet having the first robot 111 and a second robot 112. Similar to the environment 100, the environment 100' can further include one or more client devices (e.g., the client device 103-A, the client device 103-B), and one or more server devices 105. For sake of clarity, repeated descriptions with respect to the client device(s) and the server device(s) are omitted herein.

As shown in FIG. 1B, the base map 140 can be rendered via a computing device (e.g., the client device 103-B) for a user or staff of the industrial facility 130 to view or inspect different areas of the industrial facility. The base map 140 can include and show various components of the industrial facility 130, such as one or more walls, one or more rooms, and one or more industrial components (which can often be fixed or remain unmoved for a certain period of time, e.g., weeks or months), such as the industrial component 180.

In some implementations, the first robot 111 can be deployed to navigate about the industrial facility 130 utilizing the first robot map 141, and the second robot 112 can be deployed to navigate about the industrial facility 130 utilizing a second robot map 142. As a non-limiting example, the first robot map 141 can include a representation of a structure A within the industrial facility 130. Additionally or alternatively, the first robot map 141 can include a representation of the first robot 111, which can change its pose while navigating around the industrial facility 130. In other words, at different times, the representation of the first robot 111 can be at different locations of the first robot map 141 and can have different orientations. Additionally or alternatively, the first robot map 141 can detect a first environmental feature (e.g., the moving human operator 121) and include a representation of the first environmental feature in the first robot map 141.

The second robot map 142 can include a representation of a structure B within the industrial facility 130. Additionally or alternatively, the second robot map 142 can include a representation of the second robot 112 (not shown), which can change its pose while navigating around the industrial facility 130. In other words, at different times, the representation of the second robot 112 can be at different locations of the second robot map 142 and can have different orientations. Additionally or alternatively, the second robot map 142 can detect a second environmental feature (e.g., a moving forklift 122) and include a representation of the second environmental feature in the second robot map 142.

In some implementations, the first robot 111 can receive a request to provide an update for first robot detection (e.g., update for a current pose of the first robot 111 and/or current poses of one or more environmental features detected by the first robot 111 in the first robot map 141), and the second robot 112 can receive a separate request to provide an update for second robot detection (e.g., update for a current pose of the second robot 112 and/or current poses of one or more environmental features in the second robot map 142). The request received by the first robot 111 and the separate request received by the second robot 112 can be generated based on user input, or can be generated by the server device 105 automatically (e.g., periodically or other regular or nonregular interval). In some implementations, the first robot 111 and/or the second robot 112 can proactively push current pose(s) to the server device 105 without necessarily first receiving any request from the server device 105. For example, the first robot 111 can proactively push current pose(s) to the server device 105 at least periodically when it is connected to a local area network to which the server device 105 is also connected.

In response to receiving the request, the first robot 111 can provide the current pose of the first robot 111 and/or current poses of one or more environmental features (all in the first robot map 141) to, e.g., the server device 105. In response to receiving the separate request, the second robot 112 can provide the current pose of the second robot 112 and/or current poses of one or more environmental features (all in the second robot map 142) to, e.g., the server device 105.

The pose translation engine 1052 then can access the first correspondence data (and/or the first translation data) to translate the current pose of the first robot 111 and/or current poses of one or more environmental features in the first robot map 141 to corresponding poses in the base map 140. Alternatively or additionally, the pose translation engine 1052 can access the second correspondence data (and/or the second translation data) to translate the current pose of the second robot 112 and/or current poses of one or more environmental features in the second robot map 142 to corresponding poses in the base map 140.

The first translation data and/or the first correspondence data can be determined, for instance, based on identifying that the structure A in the first robot map 141 and a structure A' in the base map 140 are the same structure. The second translation data and/or the second correspondence data can be determined based on identifying that the structure B in the second robot map 142 and a structure B' in the base map 140 are the same structure.

The rendering engine 1053 can then generate a representation of the first robot 111, and/or representations of the one or more environmental features detected in the first robot map 141, in the base map 140. The rendering engine 1053 can generate a representation of the second robot 112, and/or representations of the one or more environmental features detected in the second robot map 142, in the base map 140. In some implementations, the representations of the first robot 111 and the second robot 112 may not need to be rendered in the base map 140. For instance, a user can select or configure to not display the first robot 111 and/or the second robot 112 in the base map 140.

Referring to FIG. 1B, a representation 132 of the aforementioned second environmental feature (e.g., a moving forklift 122, detected by the second robot 112) and a representation 131 of the aforementioned first environmental feature (e.g., the moving human operator 121) can be rendered visually in the base map 140. In some implementations, the representation 131 and the representation 132 can be rendered simultaneously. For example, they can be rendered simultaneously when the first robot 111 detects the first environmental feature while the second robot 112 detects the second environmental feature. In some implementations, the representation 131 and the representation 132 can be rendered at different times.

For instance, at a first moment, the first environmental feature is detected by the first robot 111 and no environmental feature is detected by the second robot 112. At this first moment, the representation 131 can be rendered, e.g., along with the gauge 180, in the base map 140, without the representation 132 of the second environmental feature being rendered in the base map 140. At a second moment, the second environmental feature is detected by the second robot 112 and no environmental feature is detected by the first robot 111. At this second moment, the representation 132 can be rendered, e.g., along with the gauge 180, in the base map 140, without the representation 131 of the first environmental feature being rendered in the base map 140. It is noted that the representation of the first environmental feature in the first robot map 141 may differ from the representation of the first environmental feature in the base map 140, in aspects such as orientation, size, color, shape, etc. The representation of the second environmental feature in the second robot map 142 may, alternatively or additionally, differ from the representation of the second environmental feature in the base map 140, in one or more aspects such as orientation, size, color, shape, etc.

In some implementations, the representation 131 can be rendered in response to the first robot 111 detecting the first environmental feature, without the first robot 111 receiving the aforementioned request. In some implementations, the representation 132 can be rendered in response to the second robot 112 detecting the second environmental feature, without the second robot 112 receiving the aforementioned separate request.

Using the base map 140 rendered with various representations (e.g., representations of the first robot 111 and/or second robot 112, representations of the first and/or second environmental features), relative poses between different environmental features can be determined. Alternatively or additionally, relative poses between the first (or second) environmental feature and an industrial component (or other structure) of the industrial facility 130 can be determined.

Figure 1C:
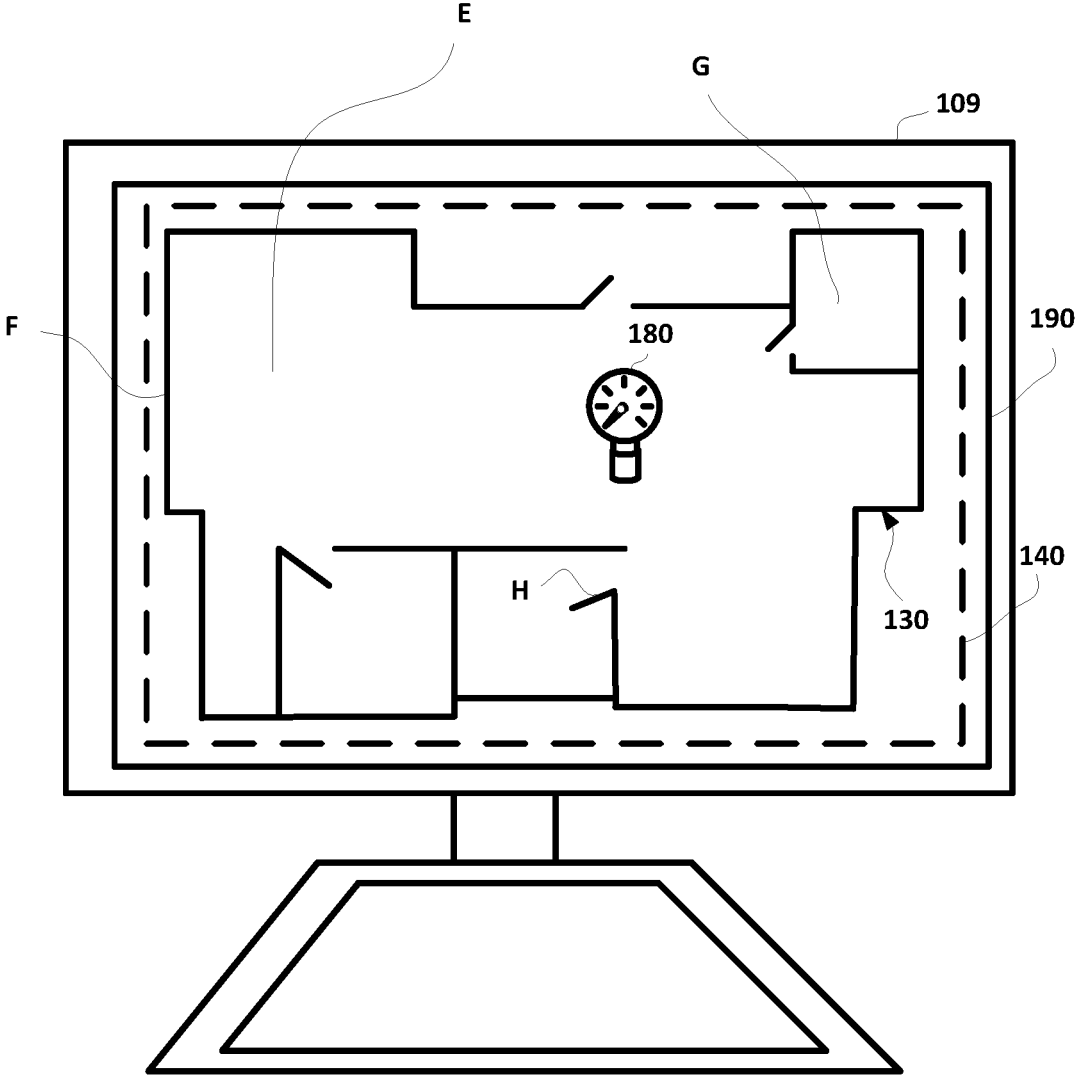
FIG. 1C depicts an example of a user interface showing a base map free of representations of object(s) detected by corresponding robot(s), in accordance with various implementations.

FIG. 1C depicts a non-limiting example of a user interface 190 showing a base map 140 not rendered without any representations of robots and objects detected by the robots, for performing selected aspects of the present disclosure, in accordance with various implementations. Such base map can be rendered, for instance, when an application that provides access to the base map is just launched via a display device 109, or when a user selects to not render any representation of robots deployed within the environment or object(s) detected by the robots. As shown in FIG. 1C, the base map 140 can be a "raw" map showing only static or fixed components within an industrial environment (e.g., industrial facility 130), including but not limited to: an open space E, a wall F, a door H, a room G, and/or a fixed sensor (e.g., gauge 180).

Figure 1D:
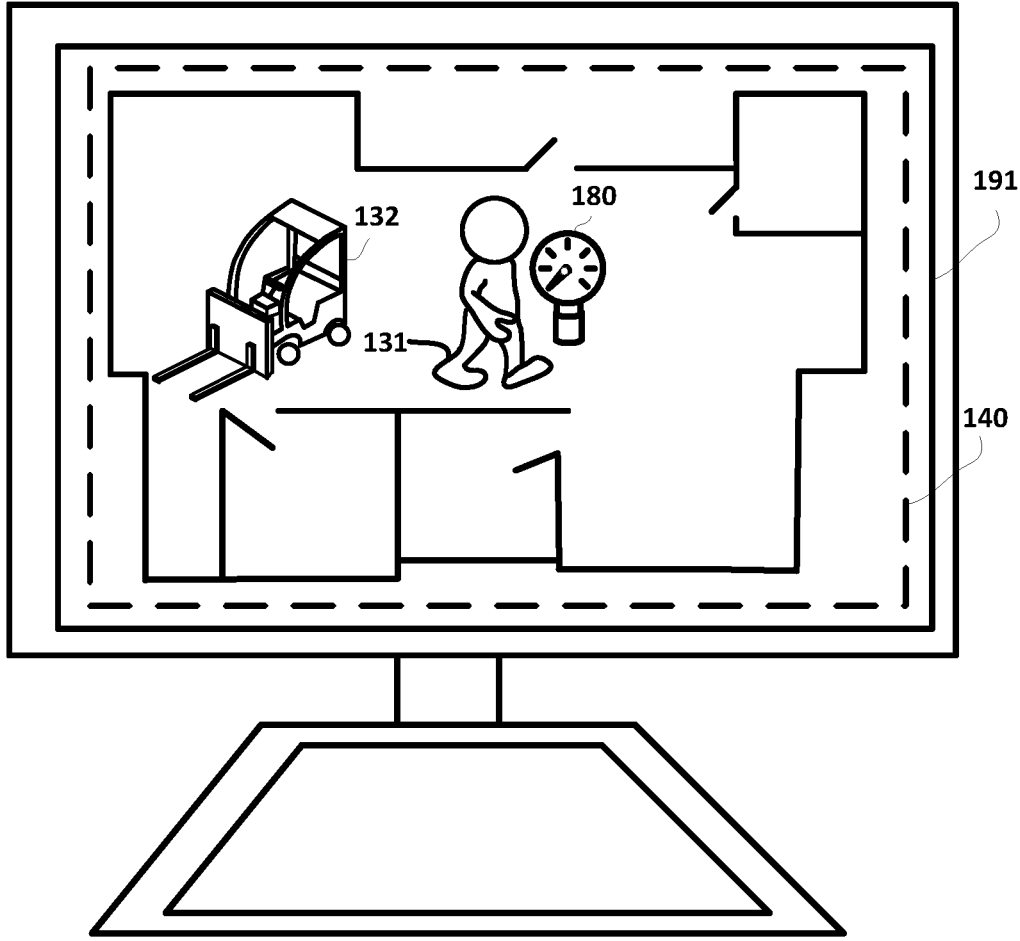
FIG. 1D depicts an example of a user interface showing a base map rendered with object(s) detected by corresponding robot(s), in accordance with various implementations.

FIG. 1D depicts a non-limiting example of a user interface 191 showing a base map rendered/annotated with object(s) detected by corresponding robot(s), for performing selected aspects of the present disclosure, in accordance with various implementations. As shown in FIG. 1D, the base map 140 can include the fixed component 180, and can be further dynamically rendered, with the representation 131 for the moving human 121 (a non-limiting example of the aforementioned first environmental feature) detected by the first robot 111 and the representation 132 for the moving forklift 122 (a non-limiting example of the aforementioned second environmental feature) detected by the second robot 112.

The representation 131 for the moving human 121 detected by the first robot 111 can be, for instance, a RGB image captured by a camera of the first robot 111, or can be a symbol (with or without a text description) representing the moving human 121. The representation 132 for the moving forklift 122 detected by the second robot 112 can be, for instance, a RGB image captured by a camera of the second robot 112, or can be a symbol (with or without a text description) representing the moving forklift 122. The representation 131 for the moving human 121 can be rendered at a corresponding base map pose (the aforementioned first base map pose for the first environmental feature) determined using techniques described in this disclosure. The representation 131 for the moving human 121 can be rendered at a corresponding base map pose (the aforementioned second base map pose for the second environmental feature) determined using techniques described in this disclosure. In this case, representations of the first robot 111 and the second robot 112 may not be rendered in the base map 140 for purposes such as saving computing resources and reduce latency, etc.

Figure 1E:
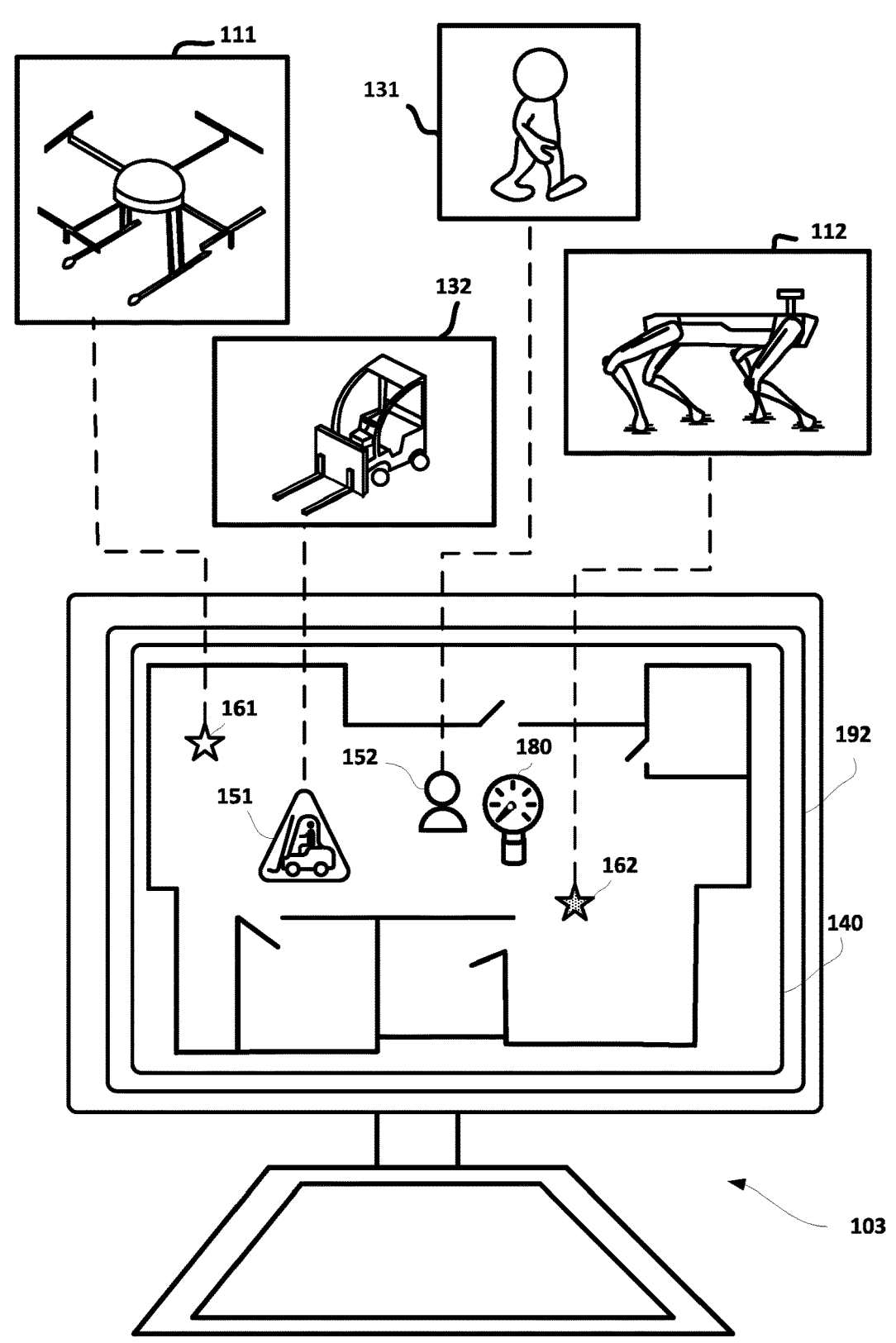
FIG. 1E depicts another example of a user interface showing a base map rendered with object(s) detected by corresponding robot(s), in accordance with various implementations.

FIG. 1E depicts another non-limiting example of a user interface 192 showing a base map 140 rendered with object(s) detected by corresponding robot(s), for performing selected aspects of the present disclosure, in accordance with various implementations. As shown in FIG. 1E, at a particular moment, the base map 140 can be dynamically rendered, with the representation 131 for the moving human 121 detected by the first robot 111. At the particular moment 1, the base map 140 can be further rendered with the representation 132 for the moving forklift 122 detected by the second robot 112. The representation 131 can be rendered in response to the first robot 111 detecting the moving human 121 in the first robot map, and the representation 132 can be rendered in response to the second robot 112 detecting the moving forklift 122 in the second robot map.

In some implementations, the base map 140 can include a representation for the industrial component 180 at any given moment as the component 180 was observed in point cloud that forms (or that is used to generate) the base map 140. In some implementations, the industrial component 180 can be a gauge, and the base map 140 can show industrial data which, includes but is not limited to, readings of the gauge 180, where the readings of the gauge 180 can vary at different moments.

As a non-limiting example, at the particular moment t, the base map 140 can show an abnormal reading of the gauge 180. The occurrence association engine 1054 can determine that the abnormal reading of the gauge 180 is associated with the moving object 121 which is represented in the base map 140 by the representation 131. Such determination by the occurrence association engine 1054 can be determined based on determining that the industrial data (i.e., the abnormal reading) temporally corresponds to detection of the first environmental feature (e.g., the abnormal reading and the moving object 121 are both detected at the particular moment/or are detected within a temporal threshold, say 0.5 s), and determining that the first base map pose, for the first environmental feature, positionally corresponds to the given map pose for the industrial data (e.g., the relative distance between the moving object 121 and the gauge 180 is within a distance threshold, e.g., 0.8 m). The association can then be stored, e.g., in the storage 15, for subsequent use. For instance, based on the stored association, the next time the abnormal reading occurs, the moving object 121 can be identified, for instance, the human operator 121 can be sent to inspect the abnormal reading and adapt an industrial process impacted by the abnormal reading.

In some implementations, alternatively, the representation for the moving human 121 at the first base map pose can be a symbol 151 which when selected, causes the representation 131 to be rendered (e.g., as an overlay) over the base map 140. In some implementations, the representation for the moving forklift 122 can be a symbol 152 which when selected, causes a symbol for the moving human 121 to be rendered (e.g., as an overlay) over the base map 140. In some implementations, optionally, the base map 140 can further include a representation 161 (e.g., a symbol) for the first robot 111, and/or include a representation 162 (e.g., a symbol) for the second robot 112, where the symbol 161 differs from the symbol 162. The first robot 111 can be, for instance, a drone. The second robot 112 can be, for instance, a robot dog. In some implementations, the representation 161 (e.g., a symbol) for the first robot 111, and the representation 162 (e.g., a symbol) for the second robot 112 can be omitted from the base map 140.

It is noted that the base map 140, when representing an industrial environment/facility in its entirety, may be referred to as a "truth map". The truth map, when annotated with robot(s) and/or object(s) detected by corresponding robot(s), can reflect a real-time representations of static and dynamic objects within the industrial facility.

FIG. 2 illustrates an example method 200 for performing selected aspects of the present disclosure, in accordance with various implementations. For convenience, the operations of the flow chart are described with reference to a system that performs the operations. This system may include various components of various computer systems, such as one or more components of the server computing device 105 (and/ or additional computing devices such as the client device 103-A or 103-B). Moreover, while operations of method 200 are shown in a particular order, this is not meant to be limiting. One or more operations may be reordered, omitted or added.

In various implementations, at block 202, the system, e.g., by way of a server such as the server computing device 105, may identify a base map for an industrial environment and a first robot map utilized by a first robot deployed in the industrial environment, where the base map differs from the first robot map.

The industrial environment can be or can include an industrial facility at which the first robot is deployed. In some implementations, the first robot map can be generated based on observations of the industrial environment or a portion thereof by the first robot. For example, the first robot map can be generated based on observations by the first robot along one or more planned routes within the industrial environment. In some implementations, the base map can be generated based on observations of the industrial environment (e.g., in its entirety) using a sensor (e.g., Lidar sensor) that is carried around the industrial environment. The base map can be a base map 3D point cloud rendered using the sensor readings of the sensor (or a 3D model), or a 2D graph (e.g., floor plan) generated and/or verified using the base map 3D point cloud from the sensor readings (or using the 3D model).

In some implementations, the first robot map is generated from sensor readings of one or more sensors of the first robot. The first robot map, for instance, can be a first robot map 3D point collected using one or more sensors movably attached to the first robot. In some implementations, the first robot map is stored as a point cloud locally at the first robot.

In various implementations, at block 204, the system, e.g., by way of a server such as the server computing device 105, may generate first translation data (and/or first correspondence data) based on comparing the base map and the first robot map. As a non-limiting example, the base map can take the form of a 3D base map point cloud (sometimes simply referred to as "base map point cloud"), and the first robot map can take the form of a 3D first robot specific map point cloud (sometimes simply referred to as "first robot specific map point cloud" or "first robot map point cloud"). In this non-limiting example, points in the base map point cloud can be compared with points in the first robot specific map point cloud, to determine first translation data (and/or first correspondence data) between the points in the first robot specific map and a portion of the points in the base map.

The first translation data can, for instance, include a first translation function that can be applied to translate any robot point in the first robot map to a corresponding base point in the base map. The first correspondence data, for instance, can include a mapping relationship between one or more points in the first robot map to one or more corresponding points in the base map.

For instance, given a point $(X_1, Y_1, Z_1)$ in the first robot map, the first translation data can indicate a point $(X_1+4.5, Y_1+3.5, Z_1)$ in the base map corresponds to the point $(X_1,$ $Y_1, Z_1)$ in the first robot map. For instance, given a point $(X_1, Y_1, Z_1)$ in the first robot map, the first correspondence data can indicate a point $(X_1', Y_1', Z_1)$ in the base map corresponds to (e.g., be mapped to) the point $(X_1, Y_1, Z_1)$ in the first robot map.

In various implementations, at block 206, the system, e.g., by way of a server such as the server computing device 105, may receive a first environmental feature and a first robot map pose, for the first environmental feature, that is in a first frame of the first robot map. In these implementations, the first feature and the first robot map pose can be determined based on processing first sensor data that is in the first frame and that is detected by the first robot. The first environmental feature, for instance, can correspond to a first object within the industrial environment, such as a forklift or a human. The first environmental feature can be detected by the first robot based on processing first sensor data (e.g., Lidar data) that is in the first frame of the first robot map. In some implementations, the first sensor data can be further processed to determine the first robot map pose (location and/or orientation) for the first environmental feature in the first frame of the first robot map.

In some implementations, the first feature and the first robot map pose can be determined based on processing the first sensor data using a machine learning model. In some implementations, instead of the first sensor data, additional first sensor data different from the first sensor data can be applied to detect the first feature, or to determine the first robot map pose for the first environmental feature in the first frame. In other words, different sensor data or partially different sensor data can be captured and utilized to detect the first feature and to determine the first robot map pose for the first environmental feature in the first frame.

The first frame can, for instance, include a reference point at an origin of a first landmark, and three reference points each at one unit distance along coordinate axes such as X-axis, Y-axis, and Z-axis. In this example, a first robot pose (e.g., X1, Y1, Z1) of the first robot can be determined with respect to the first landmark, and the first robot map pose (e.g., X1+m, Y1+n, Z1) for the first environmental feature can be determined based on relative poses between the first robot and the first environmental feature in the first frame.

In various implementations, at block 208, the system, e.g., by way of a server such as the server computing device 105, may convert, using the first translation data, the first robot map pose (i.e., in the first frame of the first robot map) to a first base map pose (i.e., in the base map). For example, given the first robot map pose (e.g., X1+m, Y1+n, Z1) for the first environmental feature in the first frame, the first translation data can be utilized to determine that the first base map pose (e.g., X1+m+4.5, Y1+n+3.5, Z1) in the base map corresponds to the first robot map pose (e.g., X1+m, Y1+n, Z1) in the first frame.

In various implementations, at block 210, the system, e.g., by way of a server such as the server computing device 105, may receive industrial data and a given map pose that corresponds to the industrial data. In some implementations, the first environmental feature corresponds to a movable object that is movable with respect to a fixed component within the industrial environment. In these implementations, the industrial data includes, for instance, an abnormal sensor reading for the fixed component within the industrial environment. The give map pose that corresponds to the industrial data includes a location and/or orientation defined/ determined in the base map.

The industrial data (e.g., the abnormal sensor reading) and/or the given map pose, for instance, can be transmitted via one or more networks. Alternatively or additionally, the industrial data can be transmitted via the one or more networks, along with an identifier of a fixed sensor that provides the abnormal sensor reading, where the identifier allows the given map pose to be derived when the industrial data is captured using the fixed sensor).

In various implementations, at block 212, the system, e.g., by way of a server such as the server computing device 105, may determine that the industrial data corresponds to the first environmental feature. In some implementations, determining that the industrial data corresponds to the first environmental feature can be based on: determining that the industrial data temporally corresponds to detection of the first environmental feature, and determining that the first base map pose, for the first environmental feature, positionally corresponds to the given map pose for the industrial data.

In some implementations, determining that the industrial data temporally corresponds to detection of the first environmental feature comprises: determining that an industrial data timestamp, for the industrial data, satisfies a temporal threshold relative to an environmental feature timestamp, for the first environmental feature, that is based on one or more times associated with the first sensor data. In some implementations, the temporal threshold can be determined based on an industrial data type of the industrial data and/or an environmental feature type of the first environmental feature. For example, a first threshold can be determined when the first environmental feature is a forklift and the industrial data is of a first sensor type. A second threshold (different from the first threshold) can be determined when the first environmental feature is a forklift and the industrial data is of a second sensor type (that is different from the first sensor type). A third threshold (different from the first and/or second thresholds) can be determined when the first environmental feature is a maintenance crew and the industrial data is of a third sensor type (that is different from the first and/or second sensor types).

In some implementations, determining that the first base map pose, for the first environmental feature, positionally corresponds to the given map pose for the industrial data can include: determining that the first base map pose and the given map pose satisfies a distance threshold. The distance threshold can vary or be determined based on the industrial data type of the industrial data and/or the environmental feature type of the first environmental feature. For instance, a first distance threshold can be determined when the first environmental feature is a maintenance crew, and a second threshold can be determined when the first environmental feature is a forklift, where the first threshold can be less than the second threshold.

In various implementations, at block 214, the system, e.g., by way of a server such as the server computing device 105, may use the determined correspondence of the industrial data to the first feature in adapting an industrial process. In some implementations, using the determined correspondence of the industrial data to the first feature in adapting the industrial processing can include: adapting one or more parameters, for operating a component (e.g., the aforementioned fixed component), used in the industrial process.

FIG. 3 illustrates another example method 300 for performing selected aspects of the present disclosure, in accordance with various implementations. For convenience, the operations of the flow chart are described with reference to a system that performs the operations. This system may include various components of various computer systems, such as one or more components of the server computing device 105 (and/or additional computing devices such as the client device 103-A or 103-B). Moreover, while operations of method 200 are shown in a particular order, this is not meant to be limiting. One or more operations may be reordered, omitted or added.

In various implementations, at block 302, the system, e.g., by way of a server such as the server computing device 105, may identify a base map for an industrial environment, a first robot map utilized by a first robot deployed in the industrial environment, and a second robot map utilized by a second robot deployed in the industrial environment. The base map, the first robot map, and the second robot map can all differ from one another.

The industrial environment can be or can include an industrial facility at which the first robot and a second robot are deployed. The first robot and the second robot can be of the same type or can be of different types. The first robot and the second robot can be manufactured by the same manufacturer or by different manufacturers. In some implementations, even if the first robot and the second robot are of the same type and are manufactured by the same manufacturer, the first robot and the second robot can generate and utilize different robot specific maps (i.e., the first robot map generated based on observations of the industrial environment by the first robot, and the second robot map generated based on observations of the industrial environment by the second robot).

In some implementations, the first robot map can be for a first region of the industrial facility (e.g., include one or more landmarks within the first region for the first robot to determine its pose within the first region), and can correspond to a first portion of the base map. The second robot map can be for a second region of the industrial facility, and can correspond to a second portion of the base map. The first region may not overlap with the second portion, or can only partially overlap with the second portion. The first portion may not overlap with the second portion, or can only partially overlap with the second portion. It is noted that even if the first region coincides with the second region, the first robot map may differ from the second robot map as they have different origins and/or coordinate systems. In this case, relative poses between the first robot and the second robot may not be determined given only a first robot pose that is determined for the first robot in the first robot map and a second robot pose that is determined for the second robot in the second robot map. Further, a first robot base pose for the first robot in the base map may not be determined, and a second robot base pose for the second robot in the base map may not be determined as correspondences between the first (or second) robot and the base map are undetermined.

In various implementations, at block 304, the system, e.g., by way of a server such as the server computing device 105, may generate first translation data (and/or first correspondence data) based on comparing the base map and the first robot map; and generating second translation data (and/or second correspondence data) based on comparing the base map and the second robot map.

In some implementations, the first translation data includes a first translation function that can be applied to translate any point in the first robot map to a corresponding point in the base map. In some implementations, the second translation data includes a second translation function that is distinct from the first translation function and that is applicable to translate any point in the second robot map to a corresponding point in the base map.

As a non-limiting example, the base map can take the form of a 3D base map point cloud (sometimes simply referred to as "base map point cloud"), and the first robot map can take the form of a 3D first robot specific map point cloud (sometimes simply referred to as "first robot specific map point cloud" or "first robot map point cloud"). In this non-limiting example, points in the base map point cloud can be compared with points in the first robot specific map point cloud, to determine first translation data (and/or first correspondence data) between the points in the first robot specific map and a portion of the points in the base map. Similarly, points in the base map point cloud can be compared with points in the second robot specific map point cloud, to determine second translation data (and/or second correspondence data) between the points in the first robot specific map and a portion of the points in the base map.

The first translation data can, for instance, include a first translation function that can be applied to translate any robot point in the first robot map to a corresponding base point in the base map. The first correspondence data can include a mapping relationship between one or more points in the first robot map to one or more corresponding points in the base map. The second translation data can include a second translation function that differs from the first translation function and that can be applied to translate any robot point in the second robot map to a corresponding base point in the base map. The second correspondence data can include a mapping relationship between one or more points in the second robot map to one or more corresponding points in the base map. It is noted that, using the first (or second) translation function and/or the first (or second) correspondence data, a designated point in the base map may be translated into a particular point in the first (or second) robot map.

In various implementations, at block 306, the system, e.g., by way of a server such as the server computing device 105, may receive a first environmental feature and a first robot map pose, for the first environmental feature, that is in a first frame of the first robot map, wherein the first environmental feature and the first robot map pose are determined based on processing first sensor data that is in the first frame and that is detected by the first robot; and receiving a second environmental feature and a second robot map pose, for the second environmental feature, that is in a second frame of the second robot map, wherein the second environmental feature and the second robot map pose are determined based on processing second sensor data that is in the second frame and that is detected by the second robot.

In some implementations, the first environmental feature corresponds to a first object within the industrial environment. In some implementations, the second environmental feature corresponds to a second object within the industrial environment.

In some implementations, the first feature and the first robot map pose are determined based on processing first sensor data using a first machine learning model. In some implementations, the second feature and the second robot map pose are determined based on processing the second sensor data using a second machine learning model that is different from the first machine learning model.

In some implementations, the first robot map is generated from sensor readings of one or more first sensors of the first robot. In some implementations, the second robot map is generated from sensor readings of one or more second sensors of the second robot.

In various implementations, at block 308, the system, e.g., by way of a server such as the server computing device 105, may converting, using the first translation data, the first robot map pose to a first base map pose; and converting, using the second translation data, the second robot map pose to a second base map pose.

In various implementations, at block 310, the system, e.g., by way of a server such as the server computing device 105, may cause rendering of the base map with a first graphical representation, of the first environmental feature, at the first base map pose and with a second graphical representation, of the second environmental feature, at the second base map pose.

In some implementations, the base map is further rendered with graphical representations of industrial data that is included in the base map, but that is absent from the first robot map and absent from the second robot map. The graphical representations of industrial data can indicate a type of a component, installation date of the component, current or recent readings related to the component, etc.

In various implementations, a further method implemented using one or more processors is provided and includes: identifying a base map for an industrial environment and a first robot map utilized by a first robot deployed in the industrial environment, where the base map differs from the first robot map.

In various implementations, the further method further includes: generating first translation data based on comparing the base map and the first robot map; receiving a first environmental feature associated with equipment in the industrial environment and a first robot map pose, for the first environmental feature, that is in a first frame of the first robot map, wherein the first environmental feature and the first robot map pose are determined based on processing first sensor data that is in the first frame and that is detected by the first robot; converting, using the first translation data, the first robot map pose to a first base map pose; receiving industrial data indicating an abnormal condition and a given map pose that corresponds to the industrial data; determining that the industrial data corresponds to the first environmental feature; and storing the determined correspondence of the industrial data to the first feature in a database accessible within the industrial environment.

Figure 4:
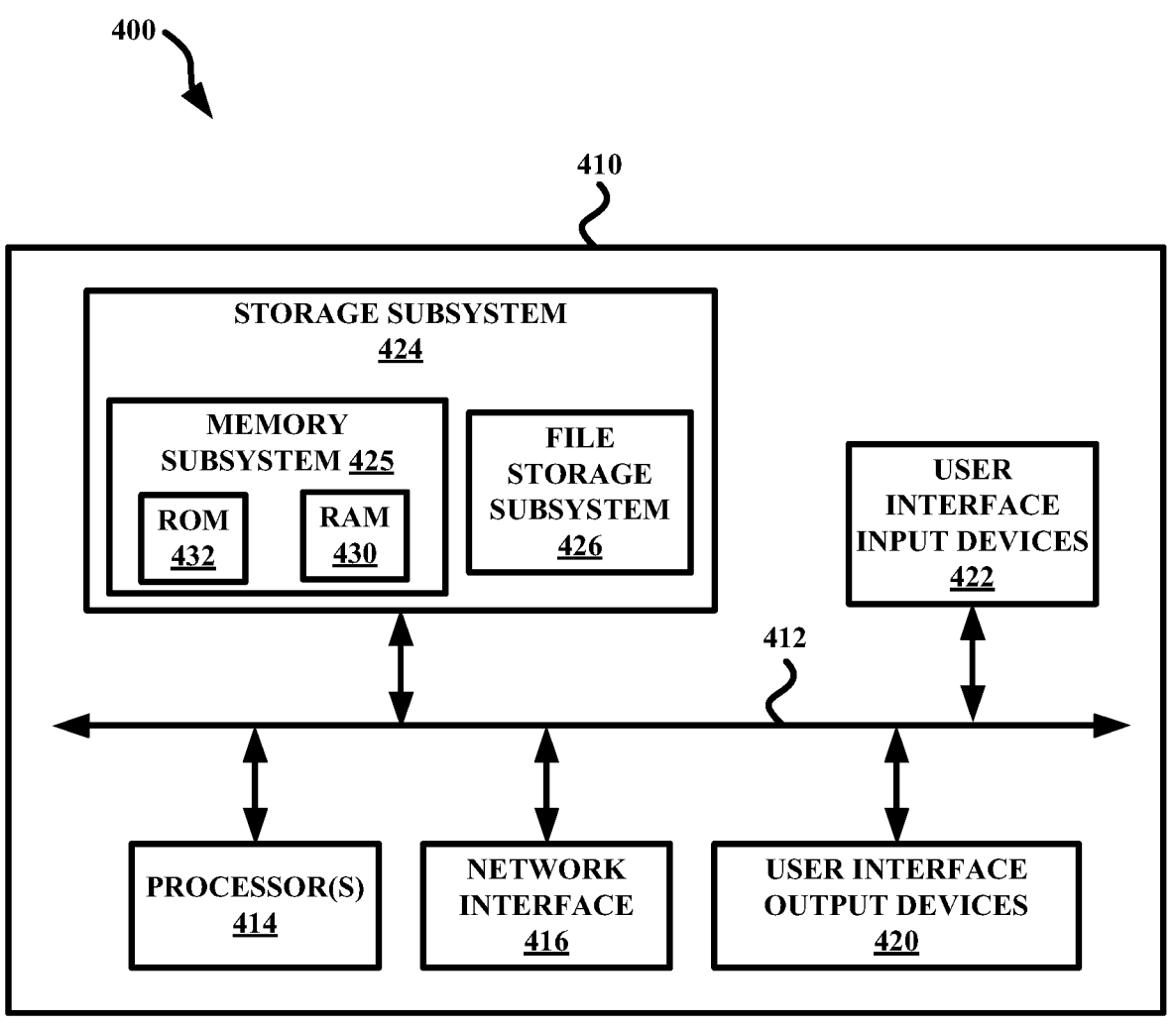
FIG. 4 schematically illustrates an example computer architecture on which selected aspects of the present disclosure may be implemented.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 3, as well as to implement various components depicted in FIGS. 1-2.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple buses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

identifying a base map for an industrial environment and a first robot map utilized by a first robot deployed in the industrial environment, wherein the base map differs from the first robot map;

generating first translation data based on comparing the base map and the first robot map;

receiving a first environmental feature and a first robot map pose, for the first environmental feature, that is in a first frame of the first robot map, wherein the first environmental feature and the first robot map pose are determined based on processing first sensor data that is in the first frame and that is detected by the first robot;

converting, using the first translation data, the first robot map pose to a first base map pose;

receiving industrial data and a given map pose that corresponds to the industrial data;

determining that the industrial data corresponds to the first environmental feature based on:

determining that the industrial data temporally corresponds to detection of the first environmental feature, and determining that the first base map pose, for the first environmental feature, positionally corresponds to the given map pose for the industrial data; and using the determined correspondence of the industrial data to the first environmental feature in adapting an industrial process.

2. The method of claim 1, wherein the first environmental feature corresponds to a movable object approaching a fixed component within the industrial environment.

3. The method of claim 2, wherein the industrial data includes an abnormal sensor reading for the fixed component within the industrial environment.

4. The method of claim 1, wherein using the determined correspondence of the industrial data to the first environmental feature in adapting the industrial process comprises:

performing, based on a type of the first environmental feature, an action with respect to the industrial process that involves the fixed component.

5. The method of claim 1, wherein the first environmental feature and the first robot map pose are determined based on processing the first sensor data using a machine learning model.

6. The method of claim 1, wherein the given map pose is in the base map.

7. The method of claim 1, wherein the industrial data is transmitted over one or more networks, along with the given map pose.

8. The method of claim 1, wherein the base map includes a component at the given map pose, and the industrial data is associated with the component.

9. The method of claim 8, wherein the industrial data includes a type of the component, installation date of the component, and/or current or recent readings related to the component.

10. A method implemented by one or more processors, the method comprising:

identifying a base map for an industrial environment, a first robot map utilized by a first robot deployed in the industrial environment, and a second robot map utilized by a second robot deployed in the industrial environment, wherein the base map, the first robot map, and the second robot map all differ from one another;

generating first translation data based on comparing the base map and the first robot map;

generating second translation data based on comparing the base map and the second robot map;

receiving a first environmental feature and a first robot map pose, for the first environmental feature, that is in a first frame of the first robot map, wherein the first environmental feature and the first robot map pose are determined based on processing first sensor data that is in the first frame and that is detected by the first robot;

receiving a second environmental feature and a second robot map pose, for the second environmental feature, that is in a second frame of the second robot map, wherein the second environmental feature and the second robot map pose are determined based on processing second sensor data that is in the second frame and that is detected by the second robot;

converting, using the first translation data, the first robot map pose to a first base map pose;

converting, using the second translation data, the second robot map pose to a second base map pose; and causing rendering of the base map with a first graphical representation, of the first environmental feature, at the first base map pose and with a second graphical representation, of the second environmental feature, at the second base map pose.

11. The method of claim 10, wherein the base map is further rendered with graphical representations of industrial data that is included in the base map, but that is absent from the first robot map and absent from the second robot map.

12. The method of claim 10, wherein the first environmental feature corresponds to a first object within the industrial environment.

13. The method of claim 10, wherein the second environmental feature corresponds to a second object within the industrial environment.

14. The method of claim 10, wherein the first translation data includes a first translation function that can be applied to translate any point in the first robot map to a corresponding point in the base map.

15. The method of claim 10, wherein the second translation data includes a second translation function that is distinct from the first translation function and that be applied to translate any point in the second robot map to a corresponding point in the base map.

16. The method of claim 10, wherein the first environmental feature and the first robot map pose are determined based on processing first sensor data using a first machine learning model.

17. The method of claim 16, wherein the second feature and the second robot map pose are determined based on processing the second sensor data using a second machine learning model that is different from the first machine learning model.

18. The method of claim 10, wherein the first robot map is generated from sensor readings of one or more first sensors of the first robot.

19. The method of claim 10, wherein the second robot map is generated from sensor readings of one or more second sensors of the second robot.

20. A method implemented by one or more processors, the method comprising:

identifying a base map for an industrial environment and a first robot map utilized by a first robot deployed in the industrial environment, wherein the base map differs from the first robot map;

generating first translation data based on comparing the base map and the first robot map;

receiving a first environmental feature associated with equipment in the industrial environment and a first robot map pose, for the first environmental feature, that is in a first frame of the first robot map, wherein the first environmental feature and the first robot map pose are determined based on processing first sensor data that is in the first frame and that is detected by the first robot;

converting, using the first translation data, the first robot map pose to a first base map pose;

receiving industrial data indicating an abnormal condition and a given map pose that corresponds to the industrial data;

determining that the industrial data corresponds to the first environmental feature based on:

determining that the industrial data temporally corresponds to detection of the first environmental feature, and determining that the first base map pose, for the first environmental feature, positionally corresponds to the given map pose for the industrial data; and storing the determined correspondence of the industrial data to the first environmental feature in a database accessible within the industrial environment.

\* \* \* \* \*